United States Patent Office 3,354,026
Patented Nov. 21, 1967

3,354,026
DE-INKING PRINTED WASTE CELLULOSIC STOCK
Robert H. Illingworth, Madison, N.J., assignor to Garden State Paper Co., Inc., Garfield, N.J., a corporation of Delaware
No Drawing. Filed Sept. 5, 1963, Ser. No. 306,705
5 Claims. (Cl. 162—5)

This invention relates to methods and agents for de-inking printed waste paper, cellulosic stock, newspapers, magazines, books, and so forth.

It has been discovered that waste printed paper may be de-inked by utilizing, as the active de-inking agent, a product formed by sulfating the fatty acyl derivative of 4-amino butanol-2. The product thus formed has the general formula $$R-CONH-CH_2-CH_2-CH(CH_3)-OSO_3Na$$

where R is a member of a long chain alkyl group having 9-19 carbon atoms.

The detergent may be used alone or in combination with such materials as alkali phosphates, polyphosphates, hydroxides, sulfonates, and the like, to enhance the detersive action.

In carrying out the de-inking process, water is introduced to a reactor or hydropulper which is equipped with means for converting bulk cellulosic waste to pulp. The de-inking agent described hereinabove is mixed with the water to form a detergent solution. The quantity of active de-inking agent employed is between about 0.1 and 3.0 percent, based upon the dry weight to the cellulosic stock to be de-inked.

Temperatures of between about 100–165° F. are entirely satisfactory. If desired, the water may be softened prior to making up the de-inking solution.

The de-inking solution should be alkaline. While any alkali or alkaline earth hydroxide or salt may be used, for this purpose sodium hydroxide, potassium hydroxide and soda ash are preferred. Sufficient alkali should be added to the de-inking solution to raise the pH of the solution into the range of between about 9 and 10.5.

The printed paper, scrap or junk is next introduced to the solution. It may be desirable to shred the stock before subjecting it to treatment. The paper stock to be de-inked is preferably added to the solution in its naturally dry condition; that is, without first subjecting it to water or moisture treatment.

The amount of paper charged, by weight of the aqueous treating solution, should generally be below about 10 percent. It has been found that good results are obtained when the de-inking solution contains less than about 6.0 percent by weight of the scrap paper and this amount is preferred. The scrap in the treating solution is retained in the reactor until substantial de-fiberization takes place.

Following this treatment, the de-fibered material is dropped to a chest or other suitable reservoir, after which it is diluted with water which is maintained at normal room temperature, until a solid content of between about 0.5 and 2.0 percent is obtained.

The resulting pulp is then separated from the solution, as by settling and decantation, filtration and similar techniques well known in the art. The recovered pulp is then formed into a web in a well-known manner.

The recovered pulp may now be blended with fresh virgin sulfate or sulfite pulp if desired.

The invention in its broader aspects is not limited to the specific composition, steps and methods described hereinabove, but departures may be made within the scope of the accompanying claims without departing from the principles of the invention and without sacrificing its chief advantages.

I claim:
1. In a method of de-inking printed waste cellulosic stock, the improvement which comprises utilizing as the active de-inking agent between about 0.1 and 3 percent by weight of the waste cellulosic stock a product formed by sulfating the fatty acyl derivative of 4-amino butanol-2, said product having the general structural formula

$$R-CONH-CH_2-CH_2-CH(CH_3)-OSO_3Na$$

where R is a long chain alkyl group containing 9–19 carbon atoms.

2. A process for de-inking printed waste paper which comprises pulping the printed cellulosic waste material in an aqueous solution comprising, as the active de-inking agent, a compound having the general formula $$R-CONH-CH_2-CH_2-CH(CH_3)-OSO_3Na$$

where R is a long chain alkyl group containing 9–19 carbon atoms, the amount of printed waste cellulosic material being below about 10 percent by weight of the aqueous solution, and the amount of de-inking agent used being between about 0.1 and 3.0 percent based upon the weight of the waste cellulosic material and continuing the pulping until the ink particles have been separated from the cellulosic fibers.

3. The method of claim 2 wherein the temperature of the water charged to the reactor is between about 100–165° F.

4. The method of claim 2 wherein the aqueous solution has an alkaline pH of between about 9 and 10.5.

5. The method of claim 2 wherein the amount of printed paper is less than about 6.0 percent by weight of the solution.

References Cited
UNITED STATES PATENTS

| | | | |
|---|---|---|---|
| 1,925,372 | 9/1933 | Darling | 162—5 |
| 1,990,376 | 2/1935 | Hass | 162—5 |
| 2,743,178 | 4/1956 | Krodel | 162—5 |

S. LEON BASHORE, *Acting Primary Examiner.*

HOWARD R. CAINE, *Examiner.*